United States Patent [19]

Ruff et al.

[11] 4,302,344

[45] Nov. 24, 1981

[54] LOOSE-FILL, THERMAL INSULATION

[75] Inventors: David L. Ruff, Torrance; N. Gokul Nath, Carson, both of Calif.

[73] Assignee: Grefco, Inc., Bala Cynwyd, Pa.

[21] Appl. No.: 123,567

[22] Filed: Feb. 22, 1980

[51] Int. Cl.$^3$ .................. C04B 43/00; C04B 43/08; C04B 43/14

[52] U.S. Cl. ........................................... 252/62

[58] Field of Search ............................... 252/62

[56] References Cited

U.S. PATENT DOCUMENTS

| | | | |
|---|---|---|---|
| 2,625,512 | 1/1953 | Powell | 252/62 |
| 2,626,872 | 1/1953 | Miscall | 106/122 |
| 2,634,207 | 4/1953 | Miscall | 92/3 |
| 3,015,626 | 1/1962 | Kingsbury | 252/62 |
| 3,030,218 | 4/1962 | Robinson | 106/71 |
| 3,042,578 | 7/1962 | Denning | 162/171 |
| 3,203,813 | 8/1965 | Gajardo | 106/40 |
| 3,623,938 | 11/1971 | Jenkins | 161/159 |
| 3,886,076 | 5/1975 | Venable | 252/62 |
| 3,903,706 | 9/1975 | Gzemski | 61/50 |
| 3,904,539 | 9/1975 | Ruff | 252/62 |
| 3,952,830 | 4/1976 | Oshida | 252/62 X |
| 4,212,755 | 7/1980 | Ruff et al. | 252/62 |

Primary Examiner—Dennis L. Albrecht
Attorney, Agent, or Firm—Everett H. Murray, Jr.; Brian G. Brunsvold; Thomas L. Irving

[57] ABSTRACT

Fire resistant, loose-fill, thermal insulation made of a mixture of particulate expanded perlite and cellulose fiber. The mixture is rendered non-settling and resistant to separation by applying a permanently tacky material to the particulate expanded perlite.

13 Claims, No Drawings

LOOSE-FILL, THERMAL INSULATION

FIELD OF THE INVENTION

The present invention is directed to particulate thermal insulation. More particularly, the present invention is directed to a fire resistant, thermal insulation formed from expanded perlite particles and cellulose fiber or from expanded particles, cellulose fiber and a tacky resin.

BACKGROUND OF THE INVENTION

Continued emphasis on energy conservation has intensified the effort to produce efficient thermal insulators that are economical to produce and install. Such materials should also exhibit a certain amount of resistance to combustion when used in certain applications.

One material finding widespread use is expanded perlite which is formed from a naturally occurring mineral (perlite ore) by a thermal treatment. Perlite ore is a volcanic mineral consisting primarily of silica, alumina and a small amount of water. Exposure of perlite ore to temperatures in the range of 1700°–2100° F. softens the mineral and causes the water to expand to form a light cellular mineral particle. Due to the low density and low thermal conductivity of expanded perlite, it has found utility as a thermal insulator. Expanded perlite has been used in its particulate form, for example, as loose-fill insulation.

Particulate expanded perlite has disadvantages that limit its usefulness as loose-fill insulation. Specifically, it has a tendency to become more compact when used in layers of sufficient thickness to provide adequate thermal insulation. The bulk density, and hence the thermal conductivity of the perlite insulation increase as the particles settle after initial implacement of the particulate perlite.

Another material finding widespread use as thermal insulation is cellulose fiber. Ordinarily, cellulose fiber is combustible and must be chemically treated to be used as thermal insulation.

It has been discovered that the combination of certain ratios of expanded perlite with cellulose fiber produces a mixture that has a low density and is therefore particularly useful as a loose-fill thermal insulation. Unexpectedly, the mixture also exhibits a surprisingly low susceptibility to combustion in light of both the porous nature of the mixture and the presence of the normally combustible cellulose fibers.

It has also been discovered that both the uniformity and the insulating properties of the mixture of perlite and fiber are significantly increased by coating, either before or after mixture with the fiber, the expanded perlite particles with a binder that renders the particles slightly tacky at room temperature. Although the particles can still be treated as loose-fill insulation, in that they can flow and conform to whatever containment is given the particles, the slight tackiness prevents the particles from sliding over one another to pack or densify after initial placement. This resistance to densification increases the thermal efficiency of this type of insulation.

Due to the bridging effect of the binder, moreover, the initial volume of the mixture of expanded perlite and fiber, treated with a binder, is significantly higher than the volume of the same amount of material without the binder. In some cases, the initial volume of the treated mixture is over two times that of the untreated mixture.

In other words, when loose-fill insulation comprising binder, fiber and perlite flows into place, the tackiness of the individual particles causes the particles to form a mass having a significantly lower initial bulk density than would be formed from non-tacky particles.

This lower initial bulk density has two major advantages. First, the thermal conductance of the thermal insulation is significantly lower than that of conventional loose-fill perlite insulation. Second, less perlite and fiber are needed to fill a given volume, resulting in significant cost savings in materials.

Furthermore, because the insulation of the present invention may be either poured or blown into attics or other insulating cavities, it lends itself to economical and efficient modes of installation.

By providing a loose-fill thermal insulation that is more thermally effective, requires less expanded perlite, achieves fire resistance of cellulose fiber without the use of a chemical fire retardant and is more resistant to degradation of thermal insulation properties, the present invention is a major improvement in expanded perlite, loose-fill insulation.

SUMMARY OF THE INVENTION

The invention is directed to compositions comprising particles of (1) expanded perlite and fibers; and (2) expanded perlite, fiber and a binder having the property of permanent tackiness in the dry state. As a fire-resistant, thermal insulation, the composition comprises about 1–90% by volume expanded perlite particles and from about 10–99% by volume cellulose fiber. The composition preferably comprises about 1–90% by volume expanded perlite particles, from about 10–99% by volume cellulose fiber and a tacky resin, preferably a self-cross-linking acrylic polymer, having a solid content from about 0.25% to about 10% by weight of the perlite. The particles are rendered tacky by the resin. Preferably, the insulation represented by this embodiment of the invention has a bulk density of 2 pounds per cubic foot (pcf), a K-factor of less than 0.30 and a flame spread less than 10.

The invention further comprises a fire resistant, thermal insulation comprising about 55–90% by weight expanded perlite particles, about 10–45% by weight cellulose fiber and a tacky resin having a solid content to about 0.5–10% by weight of the combined weight of the perlite and the fiber. The particles are rendered tacky by the resin. Preferably, this embodiment of the invention has a bulk density of about 4.5 pcf, a K-factor of 0.275 or less, a smoke density of about 5 and a flame spread less than about 10.

DETAILED DESCRIPTION OF THE PREFERRED EMBODIMENTS

One composition of the invention useful as a loose-fill insulating material employs, as a starting product, milled or unmilled expanded perlite particles, readily obtainable commercially, ranging in size from −16 to +325 mesh, as measured by Tyler standard sieves. Preferably, the sizes are −30 +100 mesh (Tyler).

As is well-known in the art, cellulose fiber is composed of a natural carbohydrate high polymer (polysaccharide). Because cellulose is the fundamental constituent of all vegetable tissues, it is the most abundant organic material in the world. Accordingly, representative sources of cellulose fiber used in the present invention include wood, grass, cotton, and paper. Such fiber is readily obtainable.

Crushed hammermilled perlite board is also a source of both expanded perlite particles and cellulose fibers that can be used as starting material for the present invention. Methods of making such a product, known in the trade as PSRI are described in U.S. Pat. Nos. 2,364,207 and 3,042,478, the disclosures of which are herein specifically incorporated by reference. As described therein, one method of making the board generally comprises forming a slurry of expanded perlite and fiber in a liquid such as water and filtering or otherwise removing the water in such a manner to form a web or sheet. This is followed by pressing to the desired thickness and density and, finally drying.

The perlite board used as starting material may be made from expanded perlite varying in size from coarse aggregate to finely milled as well as from a combination of different sized particles. Generally, the expanded perlite contains particles in the range of from $-8$ to $+400$ mesh (Tyler). Preferably, however, the particles should be of a grade such that a major portion or at least a substantial portion, are in the range from $-14$ to $+200$ mesh.

It is desirable that not more than 35% of the celluose fiber used in making the perlite board be $-200$ mesh size when tested by the method specified in the TAPPI Method T233. Preferably, the size of the fiber ranges from $-5$ to $+200$ mesh.

In accordance with use in the present invention, the board is crushed by means well-known in the art. Optimally, after crushing, the granulometry allows all of the particles to pass through a 2 mesh screen. The loose weight density of the crushed particles varies from 2.5 to 6.5 pcf with the preferred density being 3.5 to 4.5 pcf.

As a tacky resin, preferably a self-cross-linking, permanently tacky polymer, such as an acrylic polymer, is used. Examples of tacky resins that are effective include such polymer resin types as styrene-butadiene, vinylidene chloride-butadiene, carboxylated, vinyl acetate-ethylene, isobutylene, vinyl ethers, vinyl chlorides, vinyl propionate, natural rubber, polyisoprene, polyamid, epoxy and combinations thereof. A preferred commercially available acrylic polymer, in an aqueous emulsion form, is UCAR 152 from Union Carbide Chemicals.

When crushed perlite board is used as a starting material, a tacky self-cross-linking acrylic polymer such as UCAR 152 from Union Carbide Chemicals is applied, subsequent to the step of crushing, by spraying the particles with either an aqueous emulsion or organic solvent solution. Ingredients are chosen so that the resulting thermal insulation comprises about 55–90% by weight expanded perlite particles, about 10–45% by weight cellulose fiber, and a tacky resin having the solid content of about 0.5–10% by weight of the combined weight of the perlite and the fiber. A tacky resin concentration of 1.25–2.5% by weight of the perlite particles is preferred.

In embodiments of the invention in which the expanded perlite particles and cellulose fiber are obtained from sources other than crushed perlite board, the perlite particles, prior to blending with the cellulose fiber, may be treated or coated with the tacky resin binder. In such cases, the resulting insulation comprises from about 10% to about 99% by volume celluose fiber and from about 1% to 90% by volume expanded perlite particles. When utilized, the tacky resin binder has a solid content from about 0.25% to about 10% by weight of the perlite.

The binder may be sprayed onto the perlite in either an emulsion or solvent base form, although the emulsion form is preferred for safety reasons. The perlite may be simultaneously tumbled and sprayed.

After drying, the treated perlite is blended with a cellulose fiber, such as recycled waste newsprint fiber, by mixing techniques well-known in the art. If preferred, the treated perlite need not be dried prior to blending. A particularly effective technique of blending fiber and perlite involves preblending in a rotating drum, followed by air dispersion in a vacuum system. The bulk density of the fiber/perlite blend depends on the ratio of fiber to perlite, the density of the perlite, and the percentage of tacky binder used.

The compositions of the present invention possess excellent insulation properties. Moreover, because the present invention significantly reduces the settling of perlite, the compositions are more resistant to degradation of thermal insulation properties. Finally, the compositions achieve fire resistance of celluose fiber without the use of a chemical fire retardant.

The excellent insulation properties of the insulation of the present invention are demonstrated by the fact that the coefficient of thermal conductivity of such insulation, as measured by its K-factor, is generally less than 0.30 Btu in/ft$^2$ hr°F. The K-factor is generally a measure of thermal insulation efficiency and the respective insulating compositions. Its importance as an indicator of the insulating quality of insulating materials is well-known in the industry. Specifically, the K-factor is determined at a nominal mean temperature of 75° F. and is a measure of the ability of the insulating composition to retard the transference of heat, thereby providing good thermal insulation.

In the art, it is well-known that small improvements in the K-factor, are very important. A reduction of as little as 0.01–0.02 units and a K-factor of approximately 0.38 Btu in/ft$^2$ hr°F. is often considered to be of substantial value as far as the utility of the end product is concerned.

With respect to the non-settling properties of the invention, it is the function of the tacky resin to render the particles of expanded perlite or the particles of perlite and fiber tacky and thereby reduce the relative movement of the particles when such particles (and hence the coating thereon) come into contact. The degree of adhesion is not such that the individual particles are strongly adhered to one another. With the particles having the appropriate degree of tackiness, the individual particles will adhere slightly to one another and thereby form a low density, non-settling mass. The mass can easily be reduced to a flowable condition by applying a relatively small force to the mass.

This characteristic of the present invention allows the material to be packaged and shipped in containers to the site where the insulation is to be placed. Once at the site, the packages containing the insulation can be opened, and with some agitation or the application of minor force, the tackiness of the particles is overcome and the particles can flow as a granular mass into the space receiving the insulation. When the particles accumulate in this space, they once again come in contact and their tackiness provides a low density mass that resists settling.

The degree of tackiness of the particles is not susceptible to quantification. The degree of tackiness necessary for practice of the invention can readily be determined from the examples given herein as well as from the following teaching.

If the particles are excessively tacky, the bond between contacting particles will be greater than can be overcome by agitation or the application of a minor force to the mass. This has the effect of making handling of such material difficult. Once such a material is produced and packaged, it would be difficult to place the mass into the desired location by pouring. Large agglomerates would be formed that would hinder the flow of smaller particles into the space to be insulated, forming uninsulated voids.

On the other hand, if the particles are not sufficiently tacky, the insulating mass formed from the particles would have an unnecessarily high initial density and would not resist settling to even higher densities.

Preferably, the thermal insulation of the present invention is rendered permanently tacky. While the invention could be operable if the particles were tacky only upon placement in the space to be insulated, this would unnecessarily complicate the invention and no means of obtaining this characteristic are presently known.

In describing the characteristic of tackiness for purposes of this disclosure, it should be understood that the property being discussed is tackiness of the particles, not just the tackiness of the resin. Therefore, tacky materials applied to the particles are only within the teachings of this disclosure if the particles themselves are rendered tacky by the tacky material.

The property of tackiness is disclosed herein in relation to room temperature but it should be understood that the property of tackiness, not the temperature, is what is significant. The most economic manner of using the present invention is to render the particles permanently tacky at about room temperature. Obviously, the composition of the coating can be altered where the insulation is to be tacky at temperatures other than those that could be considered about room temperature.

The fire resistance properties of the insulation of the present invention are demonstrated by low values for flame spread and smoke density, two properties well-known in the art to relate to fire resistance, as will be demonstrated in the Examples. Such properties are measured by flammability tests ASTM-E84. The insulation of the present invention generally has a smoke density of about 5 and a flame spread of less than about 10.

The following examples are illustrative of the present invention. It will be apparent to those skilled in the art that various modifications and variations can be made without departing from the scope or spirit of the invention. Thus, it is intended that the present invention cover the modifications and variations of this invention provided they come within the scope of the appended claims and their equivalents.

EXAMPLE 1

Expanded perlite particles, sufficient in amount to comprise 25% by volume of the final product and having a bulk density of 3 pcf. and a size of −16 +200 mesh (Tyler sieves) were tumbled and sprayed with UCAR 152 in an amount of 2% by weight perlite. Without drying, the treated expanded perlite particles were then preblended with reclaimed, fiberized, milled, waste newsprint cellulose fiber having a bulk density of 1 pcf. in an amount constituting 75 volume percent of the total product. After air dispersion in a vacuum system, the blended product had a 2 pcf bulk density, a K-factor of 0.28–0.30, measured using an electronic heat flow meter of thermal transducer type specified in ASTM No. C518, and a low flame spread as measured by the ASTM-E84 (tunnel) test.

EXAMPLE 2

Hammermilled PSRI perlite board, comprising about 55–90% by weight expanded perlite particles and about 10–45% by weight cellulose fiber was crushed by means well-known in the art so that all of the particles passed through a 2 mesh screen and at least 50% were retained on an 8 mesh screen. UCAR 152, having a solid content of about 1.25% by weight of the combined weight of the perlite in the fiber, was spray applied to the particles as an aqueous emulsion.

By conducting ASTM-C518 test on compositions so prepared, it was found that the loose-fill compositions of the present invention had a K-factor of 0.275. The density was determined to be 4.5 pcf. Expanded perlite particles and cellulose fiber of equal density but not treated with tacky resin had a 0.300 K-factor, 9.1% poorer. Accordingly, these tests demonstrate that insulation values are better for the tacky-treated compositions of the present invention than for similar non-treated compositions.

Likewise, flammability tests ASTM-E84 demonstrated that tacky polymer-treated loose-fill compositions within the scope of the invention are more resistant to flame spread and smoke generation from smoldering than an untreated product, as shown below:

| Product | Flame Spread* | Smoke Density* |
|---|---|---|
| Untreated | 10 | 87 |
| 1.25% by weight polymer | 10 | 5 |
| 2.5% by weight polymer | 5 | 5 |

*averages of three tests.

With respect to flame spread and smoke density, as measured by flammability tests ASTM-E84, lower numbers are better and desirable. Accordingly, the Examples demonstrate that the insulation of the present invention, being more thermally effective, requiring less expanded perlite, achieving fire resistance without the use of a chemical fire retardant on the cellulose fiber and being more resistant to degradation of thermal insulation properties, is a major improvement in expanded perlite loose-fill insulation.

What is claimed is:

1. A fire-resistant, loose-fill, thermal insulation comprising from about 10% to about 99% by volume cellulose fiber, from about 1% to 90% by volume expanded perlite particles, and a tacky resin having a solid content from about 0.25% to about 10% by weight of the perlite, said particles being rendered tacky by said resin, said insulation having a bulk density less than about 2 pcf and a K-factor less than about 0.30.

2. The insulation of claim 1 wherein said tacky resin is a self-crosslinking polymer of permanent tackiness.

3. The insulation of claim 2 wherein said polymer is an acrylic polymer.

4. The insulation of claim 2 wherein said tacky resin is a coating on said perlite.

5. The insulation of claim 1 wherein said perlite particles have a particle size of −16 +325 Tyler mesh.

6. The insulation of claim 5 wherein said perlite particles have a particle size of −30 +100 Tyler mesh.

7. The fire-resistant, loose-fill, thermal insulation of claim 1 wherein said insulation has a flame spread less than about 10.

8. A fire-resistant, loose-fill, thermal insulation comprising about 55 to 90% by weight expanded perlite particles; about 10 to 45% by weight cellulose fiber; and a tacky resin having a solid content of about 0.5 to 10% by weight of the combined weight of the perlite and the fiber, said particles being rendered tacky by said resin and said insulation having a bulk density of about 4.5 pcf, a K-factor of about 0.275 or less, a smoke density of about 5 and a flame spread less than about 10.

9. The insulation of claim 8, wherein said tacky resin is a self-crosslinking polymer of permanent tackiness.

10. The insulation of claim 9 wherein said polymer is an acrylic polymer.

11. The insulation of claim 8 wherein said tacky resin has a solid content of from 1.25 to 2.5% by weight of the combined weight of the perlite and the fiber.

12. The insulation of claim 8 wherein said perlite particles have a particle size of −16 +325 Tyler mesh.

13. The insulation of claim 12 wherein said perlite particles have a particle size of −30 +100 Tyler mesh.

* * * * *

UNITED STATES PATENT AND TRADEMARK OFFICE
CERTIFICATE OF CORRECTION

PATENT NO. : 4,302,344

DATED : November 24, 1981

INVENTOR(S) : David L. Ruff et al.

It is certified that error appears in the above—identified patent and that said Letters Patent is hereby corrected as shown below:

Column 6, claim 1, lines 54-55, change "celluose" to --cellulose--.

Signed and Sealed this

Sixth Day of April 1982

[SEAL]

Attest:

Attesting Officer

GERALD J. MOSSINGHOFF

Commissioner of Patents and Trademarks